Feb. 9, 1954 E. A. KRAEMER 2,668,446
SURFACE TEMPERATURE MEASURING INSTRUMENT
Filed July 19, 1948

INVENTOR.
ELMORE A. KRAEMER
BY John W. Michael
ATTORNEY

Patented Feb. 9, 1954

2,668,446

UNITED STATES PATENT OFFICE 2,668,446

SURFACE TEMPERATURE MEASURING INSTRUMENT

Elmore A. Kraemer, West Bend, Wis., assignor to West Bend Aluminum Co., West Bend, Wis., a corporation of Wisconsin Application July 19, 1948, Serial No. 39,409

1 Claim. (Cl. 73—367)

This invention relates to an instrument for measuring surface temperatures.

Surface temperatures are best measured with thermocouples in close contact with the surface and having the associated insulated lead wires in contact with the surface for some distance. A thermometer pressed firmly against and sealed to a surface will read 5°–20° F. low for ambient temperature differentials of 50°–200° F. For high temperatures or for quick readings from an inaccessible surface a radiation thermopile or pyrometer may be used. All of these instruments are expensive and difficult to use, thus precluding their use outside of laboratory and industrial fields.

As is well known in the culinary art the proper utensil, time, and temperature are all important considerations in obtaining proper results. These factors are generally recognized and watched in most cooking but when frying meats or baking pancakes on griddles and the like the surface temperature is usually estimated roughly by dropping water or butter on the surface and observing the action. The results thus obtained are not always satisfactory, particularly in the case of pancakes where it has been found the proper temperature is quite critical and deviations result in inferior pancakes.

It is desirable, therefore, to have some instrument for indicating the surface temperature of griddles and the like. Such an instrument must be dependable, inexpensive, simple to use, and also able to withstand fairly rough handling. With the aid of such an instrument the chef may obtain uniformly good results.

An object of this invention is to provide a surface temperature indicator which is dependable, inexpensive, rugged, and simple to use.

Another object is to provide an instrument which accurately measures surface temperatures even where the surface is warped.

A further object is to provide a surface temperature indicator in which linkages are eliminated and the structure is retained in its assembled reltaionship in a simple fashion.

Other objects and advantages will be pointed out in, or be apparent from, the specification and claim, as will obvious modifications of the embodiment shown in the drawings, in which:

Figure 1:
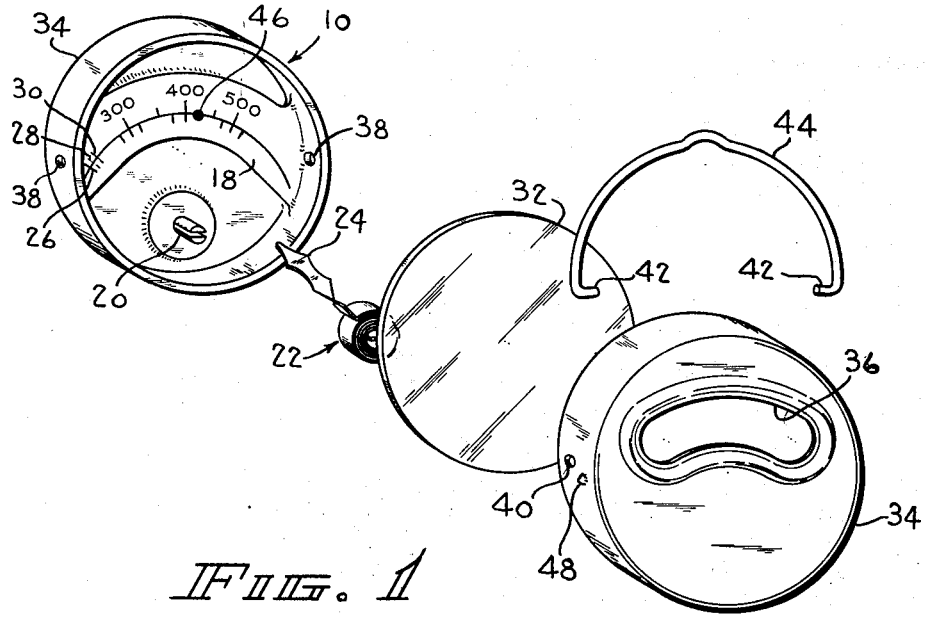
Fig. 1 is an exploded perspective view showing the component parts of the instrument.
Figures 2, 3:
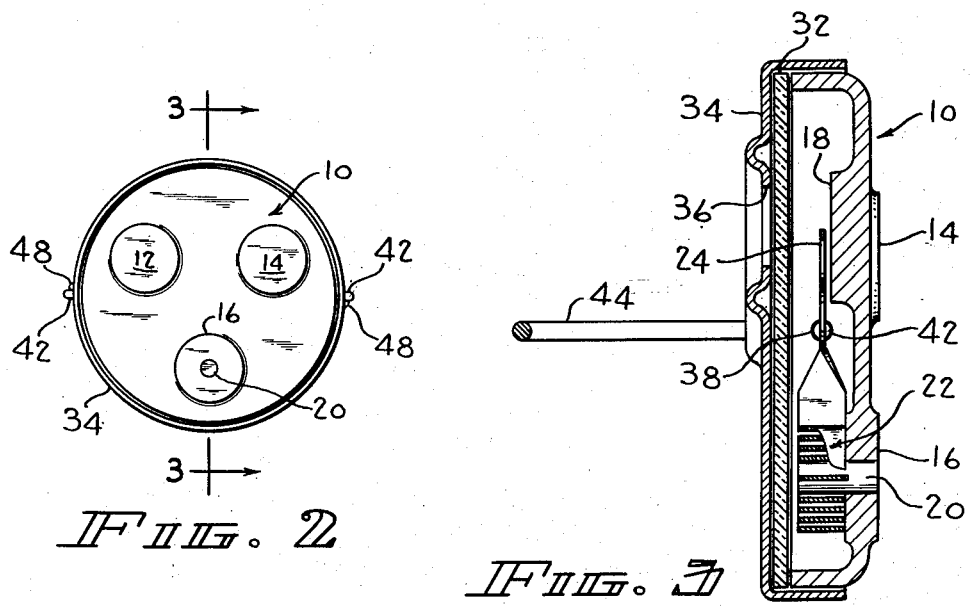
Fig. 2 is a bottom plan view showing the projecting feet adapted to rest on the surface.
Fig. 3 is a view taken from line 3—3 in Fig. 2 and shows the pin carried bimetallic coil mounted in the instrument.

Referring to the drawings, the instrument has a cupped casing 10 provided with three projecting feet 12, 14, 16 on the bottom thereof and an arcuate raised portion 18 on the upper surface bearing suitable indicia of temperature. In the embodiment illustrated, the indicated temperature range is between 275° and 525° F. A slotted pin 20 is mounted with one end flush with the base of foot 16 and the other end projecting into the interior of the casing 10. The inner end of coiled bimetal 22 engages the slot and its free end is twisted and stamped to form a suitable pointer or indicator 24 which moves over the indicia on raised casing portion 18 when the bimetal is heated.

Marks 26, 28, 30 at the lefthand extremity of arcuate portion 18 in casing 10 may indicate such temperatures as, for example, 70°, 80° and 90° F. and serve to aid in assembling and calibrating the instrument. Thus when bimetal 22 is mounted on pin 20 the pin may be rotated in its mounting in foot 16 until pointer 24 overlies the mark corresponding to the room temperature at the time of assembly. Since the fit between the pin and the foot 16 is tight, the pin will not rotate in its mounting and the indicator requires no further adjustment. Glass 32, having substantially the same diameter as the casing, rests on the upper edge of the casing to hold the bimetal in the slot and to keep the interior clean. It is preferred that the casing edge be uneven to provide small air vents between the glass and the edge and insure against building up pressure within the instrument. The glass may be heat-treated but this is considered an unnecessary expense in making the instrument since continued use of the instrument and consequent heating and cooling of the glass will serve to heat treat the glass.

Cover 34 telescopes over the glass and casing and rests on the glass with arcuate cutout 36 over the arcuate raised portion 18 bearing the temperature indicia. It will be noted that the casing wall is provided with diametrically opposed holes 38, 38 and that the cover skirt is provided with similar opposed holes 40 which are adapted to align with the casing holes 38. Inwardly projecting ends 42, 42 of resilient bail 44 extend through the holes 38, 40 in the casing and cover respectively to lock the parts of the instrument in their assembled position.

When thus assembled, the instrument requires no linkage to actuate the pointer and is retained in its assembled position without the use of otherwise unnecessary parts but simply by means of the bail which is desirable for lifting the meter off the hot griddle or other surface. It is to be noted that a hump 48 is formed on the cover wall to the right of each hole 40 to co-act with the bail and to hold the bail upright when in use.

Since the slotted pin mounting bimetal 22 is positioned in foot 16 the heat conducted from the hot surface through foot 16 is rapidly transmitted to the bimetal so that the bimetal is truly sensitive to surface temperature. The provision of the three feet 12, 14, 16 allows the instrument to be utilized on an uneven or warped surface as is often encountered, especially with griddles which have been subjected to rapid or frequent heating and cooling. The area of the feet should be kept rather small so that proper contact with the hot surface will be insured, thus avoiding one of the great sources of inaccuracy found in measuring surface temperatures.

When this instrument is placed on a properly designed griddle which evenly spreads the heat, it will register the surface temperature of the entire griddle within quite accurate limits. The meter will, of course, accurately indicate the temperature of a particular small area of a surface which does not spread the heat evenly. The dot 46 in the vicinity of 425° indicates the proper temperature for baking pancakes. The other temperatures indicated may be utilized to advantage. For example, the desired temperature for pan-frying a steak is approximately 525°. While the instrument may be left on the griddle when baking pancakes, the spattering grease encountered when frying meats precludes use of the meter after the frying is started.

The arcuate raised portion 18 on the upper surface of the die cast aluminum casing 10 serves two purposes: first, it raises the indicia close to the plane of pointer 24 travel to eliminate the possibility of erroneous readings due to angular sighting, and second, makes it a simple matter in production to properly wipe excess paint from surface 18 after filling the indicia marks. It is preferred that cover 34 be made of stainless steel for ready cleaning and enhanced appearance. It is also preferred that bail 44 be made of resilient stainless steel so that it will not attain a high temperature and the griddle meter may be removed from the hot surface without requiring the use of pot holders or other similar insulating means.

Thus it will be apparent that I have provided an extremely simple and inexpensive surface temperature-indicating instrument which may be readily utilized in the kitchen to improve the quality and give consistently good results in a cooking field heretofore largely governed by antiquated practice.

Various changes within the scope of the claims will be obvious from or suggested by the drawings and specification.

A surface temperature-indicating instrument comprising a cupped casing having three feet projecting from the casing bottom to permit the casing to rest on uneven surfaces while maintaining suitable heat-conducting contact with the surface, the upper surface of the casing having indicia thereon, a slotted pin mounted in one of the feet in heat-conducting relationship and projecting upwardly from the casing, a coiled bimetallic element having one end engaging said slotted pin and the other end adapted to move with respect to said indicia in response to surface temperature changes, a cupped cover telescopically engaging said casing and retaining said bimetallic element in said slotted pin, and a bail engaging both members for retaining them in assembled position and for lifting the instrument from the hot surface, said cover having an opening therein overlying said indicia to permit observation of the indicated temperature.

ELMORE A. KRAEMER.

References Cited in the file of this patent

UNITED STATES PATENTS

| Number | Name | Date |
| --- | --- | --- |
| 804,504 | Saalbach et al. | Nov. 14, 1905 |
| 1,325,547 | Wheeler | Dec. 23, 1919 |
| 1,692,551 | Harris | Nov. 20, 1928 |
| 1,716,473 | Weisenfels | June 11, 1929 |
| 1,746,929 | Clark | Feb. 11, 1930 |
| 1,883,554 | Chapman | Oct. 18, 1932 |
| 2,426,077 | Bak | Aug. 19, 1947 |